June 19, 1934.  C. R. BURRELL  1,963,646
PORTABLE MEASURING VALVE
Filed April 8, 1932  2 Sheets-Sheet 1
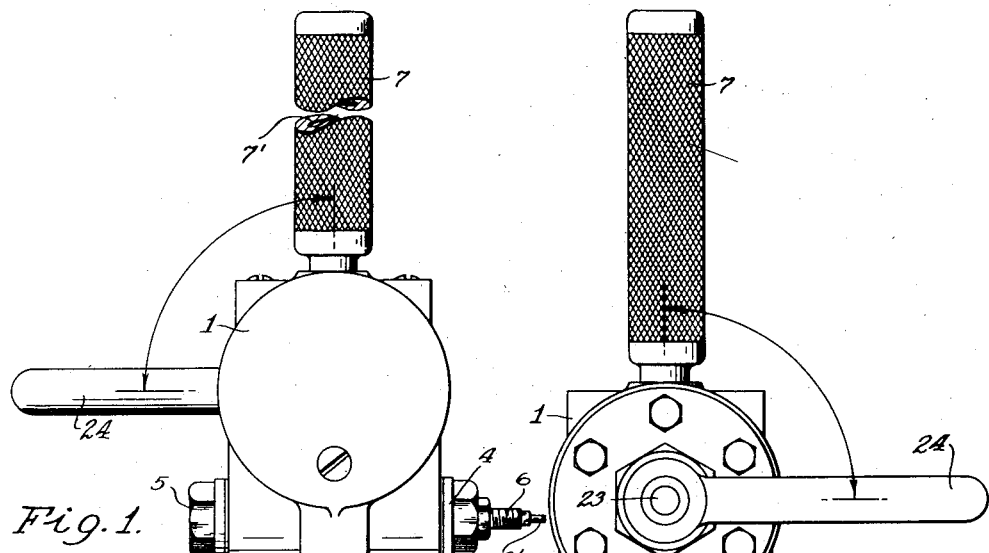
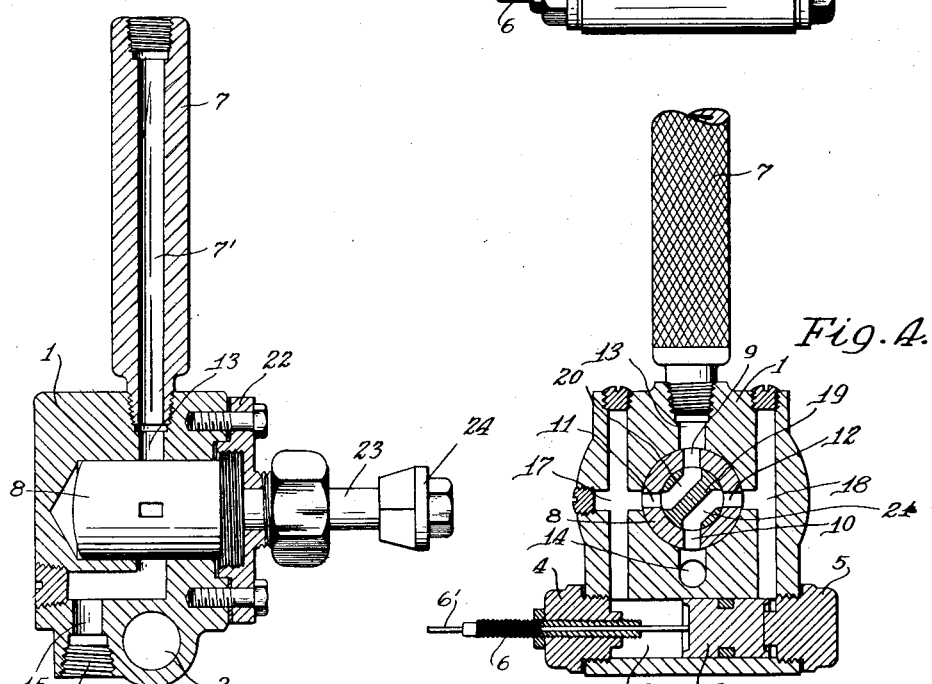
INVENTOR
Clarence R. Burrell,
BY
ATTORNEYS

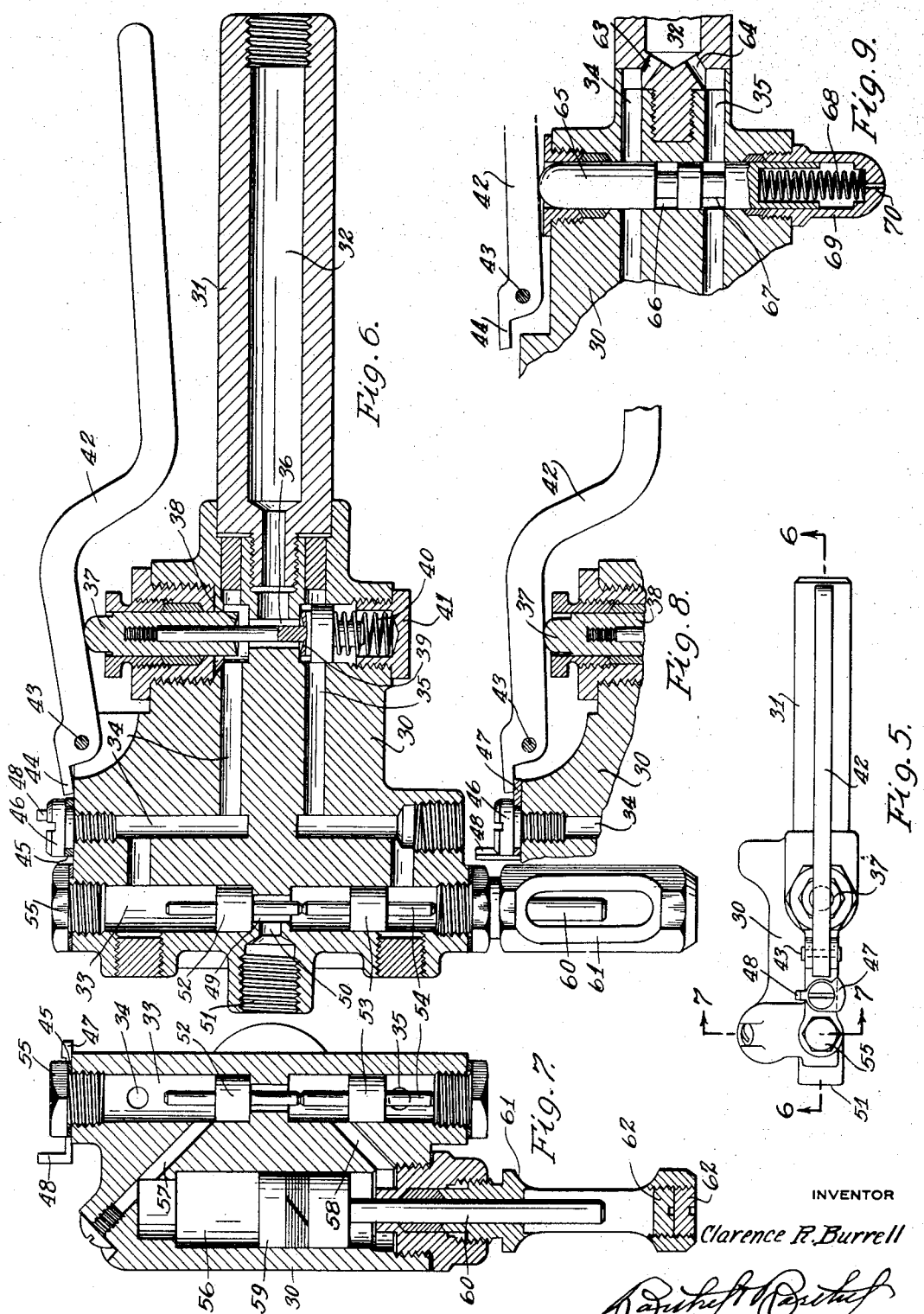

Patented June 19, 1934

1,963,646

UNITED STATES PATENT OFFICE 1,963,646

PORTABLE MEASURING VALVE

Clarence R. Burrell, Battle Creek, Mich., assignor, by mesne assignments, to The Farval Corporation, Cleveland, Ohio, a corporation of Ohio Application April 8, 1932, Serial No. 604,029

7 Claims. (Cl. 221—102)

The present invention pertains to a novel portable measuring valve or grease gun designed to be carried from bearing to bearing to lubricate one bearing at a time with a measured quantity of lubricant. Portable grease guns have already been provided but these do not deliver measured quantities, while on the other hand stationary systems for delivering measured quantities have also been proposed as disclosed for example in the copending application of Leonard R. Kerns, Serial No. 341,958, filed February 23, 1929.

The present invention, however, combines both features of portability and delivery of measured quantities of lubricant. The device of the invention is in reality a portable measuring valve having a line connection to a suitable source and operable by a handle or the like, whereupon the pressure of the supply lubricant causes the discharge of a measured quantity.

The invention is fully disclosed by way of example in the following description and in the accompanying drawings, in which—

Figure 1 is a plan view of the device;

Fig. 2 is a bottom plan view;

Fig. 3 is a longitudinal section, showing the control valve in elevation;

Fig. 4 is a longitudinal section in a plane at right angles to Figure 3;

Fig. 5 is a plan view of a modified form;

Figs. 6 and 7 are sections on the lines 6—6 and 7—7 respectively of Figure 5;

Fig. 8 is a detail of Figure 6, showing a different adjustment; and

Fig. 9 is a detail longitudinal section of another modification.

Reference to these views will now be made by use of like characters which are employed to designate corresponding parts throughout.

In Figures 1 to 4 the device is shown as comprising a body 1 formed with a measuring chamber 2 in which a piston 3 is slidably mounted. The ends of the chamber 2 are defined by plugs 4 and 5 screwed into the body, and through the plug 4 is passed an adjustable screw 6 extending into the measuring chamber for limiting the stroke of the piston as will presently appear. A slidable indicator pin 6' is passed through the screw 6 and has its inner end attached to the piston 3 to indicate externally the movement of the piston and the operation of the device.

Into the opposite side of the body 1 is connected a handle 7 formed with an axial passage 7'. The handle is adapted to be connected by means of a flexible hose to a source of lubricant under pressure.

In the center of the body is fitted a cylindrical valve casing 8 having an intake port 9, a discharge port 10 and two additional ports 11 and 12. The body 1 is formed with an intake passage 13 connecting the passage 7' to the port 9 and with a discharge passage 14 extending from the discharge port 10. The passage 14 has a branch 15 extending through the surface of the body and lying parallel to the passage 8, and the branch 15 is tapped at 16 to be threaded on a lubricating nipple at the bearing, by turning the handle 7. Finally, the body is formed with two more passages 17 and 18 connecting the additional ports 11 and 12 respectively to the ends of the measuring chamber 2.

In the valve casing 8 is mounted a rotatable valve plug 19 having a pair of ports 20 and 21, the ends of which are so spaced as to register with any two adjacent ports in the valve casing. Thus, the port 20 is shown in Figure 4 as connecting the ports 9 and 11 while the port 21 connects the ports 10 and 12, but the valve may be reversed so that the port 20 connects the ports 11 and 10 and the port 21 connects the ports 12 and 9.

The side of the body 1 through which the valve casing 8 and valve plug 19 are inserted is closed by a plate 22 through which extends the stem 23 of the valve plug. The stem carries a handle 24 by means of which the valve plug may be shifted from one position to another. In the operation of the device in the position shown in Figure 4, lubricant is admitted through the ports 13, 9, 20, 11 and passage 17 to the chamber 2 at one side of the piston 3. The valve is then reversed so that fluid is delivered through the passage 18 to the other side of the piston, while the previously admitted charge is expelled, by movement of the piston 3, through the passage 17, valve plug 19, port 10 and discharge passage 14. To lubricate another bearing, the valve plug 19 is returned to the position shown in Figure 4 whereupon the charge admitted to the chamber 2 through the passage 18 is now expelled, by movement of the piston 3, through this passage and valve plug to the discharge passage 14. When the valve is idle, the valve plug 19 should be adjusted to cover the intake port 9, inasmuch as the passage 7' is in permanent communication with a source of lubricant under pressure.

In the modification shown in Figures 5 to 8, the device also comprises a body 30 having an elongated handle 31 with a passage 32 therein adapted for connection with a source of lubricant under pressure as already described. The body is formed with a valve chamber 33 and branches 34 and 35 leading from the passage 32 respectively to the ends of the chamber. At the inner end of the passage 32 is a transverse bore 36 which connects the passage to the branches 34 and 35. In the body is slidably mounted a double valve member 37 having heads 38 and 39 adapted to seat selectively and respectively on the ends of the bore 36, to connect the passage 32 alternately to the branches 34 and 35. The valve member is urged upwardly by a spring 40 bearing on the lower end thereof and seated in a plug 41 screwed into the body. The valve may be moved against this spring by means of a handle 42 pivoted to the body as at 43.

The upward movement of the valve and handle by the spring 40 is limited by the engagement of the forward end 44 of the handle upon the body 30 as shown in Figure 6. Adjacent this end, a ring 45 is rotatably mounted on a stud 46 and has a retaining piece 47 adapted to extend beneath the end 44 as shown in Figure 8 and thereby hold the valve member 37 in a depressed condition against the action of the spring 40. Thus, while the valve head 38 is in open position and the head 39 in closing position in Figure 6, the adjustment of the member 47 as in Figure 8, reverses the condition of the valve heads. The member 47 is readily shifted from one position to another by means of a finger piece 48 projecting upwardly from the ring 45.

The valve chamber 33 has an intermediate restricted portion 49 from which extends a discharge passage 50 tapped at 51 to be screwed on a nipple at the bearing. Pistons 52 and 53 mounted on pins 54 are inserted in the chamber 33 from the ends thereof which are subsequently closed by plugs 55. These pistons are adapted to seat respectively at the ends of the restricted portion 45 as will presently appear.

The body is formed with a piston or measuring chamber 56 having its ends in communication with the chamber 33, at opposite sides of the restricted portion 49, by means of ducts 57 and 58. A piston 59 is mounted in the chamber and actuated by fluid pressure in the passages 57 and 58 as will presently appear.

A stem 60 extends from the piston 59 through a side member 61 threaded into one end of the chamber 56. This member furnishes a visible indication of the movement of the piston and hence of the operativeness of the device. In the outer end of the member 61 are threaded two adjustable nuts 62, one of which serves as a stop for the stem 60 and piston 59. These nuts may be adjusted to regulate the stroke of the piston and hence the output of the device as will presently appear.

In the operation of the device in the position shown in Figure 6, the valve head 38 being in open position and the head 39 in closing position, fluid under pressure from the source flows through passage 32 and branch 34 to the upper side of the chamber 33. The upper end of the restricted portion 45 is closed by the piston 52, and the fluid continues to flow through the duct 57 to the measuring chamber 56, moving the piston 59 to its outermost position. On reversing the valve member 37, fluid is admitted to the branch 35 and lower side of the chamber 33, moving the pistons 52 and 53 upwardly until the latter closes against the lower end of the restricted portion 49. The pistons 52 and 53 have sufficient clearance in the chamber 33 to permit their free movement although the chamber is filled. This movement opens the duct 58 to the branch 35 and opens the duct 57 to the outlet 50. The piston 59 is thus raised by fluid pressure therebeneath, whereupon the charge previously admitted into the chamber 56 at the upper side of the piston is expelled through the duct 57 and outlet 50. To lubricate the next bearing, the valve 37 is returned to the position shown in Figure 6, whereupon, in a similar manner, the charge in the chamber 56 beneath the piston 59 is expelled through the duct 58 and outlet 50.

In Figure 9 is illustrated a modification of the double valve structure wherein the handle passage 32 is connected to the branches 34 and 35 by ports 63 and 64. The control valve is a cylindrical member 65 slidably mounted across the passages 34 and 35 and adapted to obstruct one or the other. This member has two peripheral grooves 66 and 67 adapted to be brought into the branches 34 and 35 respectively, one at a time, to open one and close the other. This member is operated by the handle 42 previously described, and is normally raised by a spring 68 bearing against the lower end thereof and seated in a cap 69 threaded into the body. The cap has a vent 70 to permit free movement of the member 65 and solidification of lubricant that might leak into the cap.

Although specific embodiments of the invention have been illustrated and described, it will be understood that various alterations in the details of construction may be made without departing from the scope of the invention, as indicated by the appended claims.

What I claim is:—

1. A portable measuring valve comprising a body having a hollow handle adapted for connection to a supply of lubricant under pressure, said body having a discharge passage adapted for connection to a bearing to be lubricated, said body having a valve chamber communicating with said hollow handle and a pair of passages leading therefrom and communicating with pressure-actuated means adapted to alternately receive lubricant from said passages to discharge it in measured quantities out said discharge passage, a valve in said chamber, means resiliently holding said valve in a position closing one of said passages, and a pivoted lever mounted on said body and extending substantially parallel to said hollow handle and engaging said valve so that pivotal movement thereof moves said valve and said resilient holding means to close one of said passages and open the other.

2. A portable measuring valve comprising a body having a hollow handle adapted for connection to a supply of lubricant under pressure, said body having a discharge passage adapted for connection to a bearing to be lubricated, said body having a valve chamber communicating with said hollow handle and a pair of passages leading therefrom and communicating with pressure-actuated means adapted to alternately receive lubricant from said passages to discharge it in measured quantities out said discharge passage, a valve in said chamber, means resiliently holding said valve in a position closing one of said passages, a pivoted lever mounted on said body and extending substantially parallel to said hollow handle and engaging said valve so that pivotal movement thereof moves said valve and said resilient holding means to close one of said passages and open the other, and means on said body for locking said lever in a manner to positively hold said valve in one of its positions.

3. A portable measuring valve comprising a body having a hollow handle adapted for connection to a supply of lubricant under pressure, said body having a discharge passage adapted for connection to a bearing to be lubricated, said body having a valve chamber communicating with said hollow handle and a pair of passages leading therefrom and communicating with pressure-actuated means adapted to alternately receive lubricant from said passages to discharge it in measured quantities out said discharge passage, a valve in said chamber, means resiliently holding said valve in a position closing one of said passages, and a pivoted lever mounted on said body and extending substantially parallel to said hollow handle and engaging said valve so that pivotal movement thereof moves said valve and said resilient holding means to close one of said passages and open the other, said lever having a projecting finger thereon limiting pivotal movement thereto to maintain the same in close proximity to said hollow handle.

4. A portable measuring valve comprising a body having a hollow handle adapted for connection to a supply of lubricant under pressure, said body having a discharge passage adapted for connection to a bearing to be lubricated, said body having a valve chamber communicating with said hollow handle and a pair of passages leading therefrom and communicating with pressure-actuated means adapted to alternately receive lubricant from said passages to discharge it in measured quantities out said discharge passage, a valve in said chamber, means resiliently holding said valve in a position closing one of said passages, a pivoted lever mounted on said body and extending substantially parallel to said hollow handle and engaging said valve so that pivotal movement thereof moves said valve and said resilient holding means to close one of said passages and open the other, said lever having a projecting finger thereon limiting pivotal movement thereto to maintain the same in close proximity to said hollow handle, and means on said body for engaging said finger to lock said lever against pivotal movement.

5. A portable measuring valve comprising a body having a valve chamber and a measuring chamber, a piston in said measuring chamber, said body having a pair of ducts connecting said valve chamber to the ends of said measuring chamber, said body having a control valve chamber, a handle secured to said body and having an intake therein communicating with said control valve chamber, said body having intake passages connecting said control valve chamber to said valve chamber, a valve in said control valve chamber having resilient means normally maintaining said valve in a position closing one of said intake passages, and a lever pivotally mounted on said body and extending outwardly in a plane substantially parallel to said handle, said lever contacting with said valve whereby pivotal movement thereof depresses said valve to close the intake passage previously open and open the other passage.

6. A portable measuring valve comprising a body having a valve chamber and a measuring chamber, a piston valve in said valve chamber, a piston in said measuring chamber, said body having a pair of ducts connecting said valve chamber to the ends of said measuring chamber, said body having a control valve chamber, a handle secured to said body and having an intake therein communicating with said control valve chamber, said body having intake passages connecting said control valve chamber to said valve chamber, a valve in said control valve chamber having resilient means normally maintaining said valve in a position closing one of said intake passages, and a lever pivotally mounted on said body extending outwardly in a plane substantially parallel to said handle, said lever contacting with said valve whereby pivotal movement thereof depresses said valve to close the intake passage previously open and open other passage, said lever having a projecting finger engaging said body to restrict pivotal movement thereof in a direction away from said handle.

7. A portable measuring valve comprising a body having a valve chamber and a measuring chamber, a piston valve in said valve chamber, a piston in said measuring chamber, said body having a pair of ducts connecting said valve chamber to the ends of said measuring chamber, said body having a control valve chamber, a handle secured to said body and having an intake therein communicating with said control valve chamber, said body having intake passages connecting said control valve chamber to said valve chamber, a valve in said control valve chamber having resilient means normally maintaining said valve in a position closing one of said intake passages, a lever pivotally mounted on said body and extending outwardly in a plane substantially parallel to said handle, said lever contacting with said valve whereby pivotal movement thereof depresses said valve to close the intake passage previously open and open the other passage, said lever having a projecting finger engaging said body to restrict pivotal movement thereof in a direction away from said handle, and means on said body for engaging said finger to lock said lever against pivotal movement.

CLARENCE R. BURRELL.